US008918404B1

(12) United States Patent
Dachille (10) Patent No.: US 8,918,404 B1
(45) Date of Patent: Dec. 23, 2014

(54) DISPLAYING CONTENT IN A USER INTERFACE IN A SOCIAL NETWORK SYSTEM

(71) Applicant: Frank Clare Dachille, Mountain View, CA (US)

(72) Inventor: Frank Clare Dachille, Mountain View, CA (US)

(73) Assignee: Google Inc., Mountain View, CA (US)

( * ) Notice: Subject to any disclaimer, the term of this patent is extended or adjusted under 35 U.S.C. 154(b) by 105 days.

(21) Appl. No.: 13/648,165

(22) Filed: Oct. 9, 2012

(51) Int. Cl.
*G06F 7/00* (2006.01)
*G06F 17/30* (2006.01)

(52) U.S. Cl.
USPC .......................................................... 707/748

(58) Field of Classification Search
None
See application file for complete search history.

(56) References Cited

U.S. PATENT DOCUMENTS

| 8,055,655 | B1 * | 11/2011 | He et al. ........................ 707/727 |
| 2008/0270915 | A1 * | 10/2008 | Tevanian et al. ............... 715/751 |
| 2009/0281851 | A1 * | 11/2009 | Newton et al. .................... 705/7 |
| 2010/0153404 | A1 |  6/2010 | Ghosh |
| 2011/0145219 | A1 |  6/2011 | Cierniak |
| 2011/0191406 | A1 |  8/2011 | Plunkett |
| 2011/0213785 | A1 |  9/2011 | Kristiansson |
| 2011/0231296 | A1 |  9/2011 | Gross |
| 2011/0270777 | A1 * | 11/2011 | Weiser .......................... 705/347 |
| 2011/0282943 | A1 | 11/2011 | Anderson |
| 2011/0314007 | A1 | 12/2011 | Dassa |
| 2012/0101808 | A1 * |  4/2012 | Duong-Van ....................... 704/9 |
| 2013/0006978 | A1 * |  1/2013 | Cierniak et al. .............. 707/728 |
| 2013/0097176 | A1 * |  4/2013 | Khader et al. ................ 707/748 |

\* cited by examiner

*Primary Examiner* — Uyen Le
(74) *Attorney, Agent, or Firm* — IP Spring (57) ABSTRACT

Implementations generally relate to displaying content items in a user interface in a social network system. In some implementations, a method includes determining a first subset of content items from a plurality of content items. The method also includes computing importance scores for the content items in the first subset, and aggregating the importance scores of the content items in the first subset. The method also includes determining a second subset of content items from the plurality of content items, computing importance scores for the content items in the second subset, and aggregating the importance scores of the content items in the second subset. The method also includes selecting one of the first and second subsets based at least in part on aggregated importance scores of the first and second subsets, and causing the content items of the selected subset to be displayed in a user interface.

20 Claims, 5 Drawing Sheets

FIG. 5

DISPLAYING CONTENT IN A USER INTERFACE IN A SOCIAL NETWORK SYSTEM

BACKGROUND

Social networking websites often list many activities or comments about an activity on the display screen of a user device. Screen real estate is a limited asset and is even more of an issue with a mobile device due to the limited size of its display screen. As a result, a limited number of activities and comments about such activities are shown on a display screen, usually in a temporal order.

SUMMARY

Implementations generally relate to social networking systems, and more particularly to displaying content in a user interface in a social network system. In some implementations, a method includes determining a first subset of content items from a plurality of content items. In some implementations, the method further includes computing importance scores for the content items in the first subset, and aggregating the importance scores of the content items in the first subset. In some implementations, the method further includes determining a second subset of content items from the plurality of content items, computing importance scores for the content items in the second subset, and aggregating the importance scores of the content items in the second subset. In some implementations, the method further includes selecting one of the first and second subsets based at least in part on aggregated importance scores of the first and second subsets, and causing the content items of the selected subset to be displayed in a user interface.

With further regard to the method, to determine the first and second subsets of the content items, the method further includes removing one or more content items from the plurality of content items. In some implementations, the computing of importance scores is based on one or more signals, and where at least one signal is based on a relationship between each content item and at least one other content item. In some implementations, at least one signal is based on a number of approval indicators associated with each content item. In some implementations, at least one signal is based on a popularity value associated with each commenter of each content item. In some implementations, at least one signal is based on a length of each content item. In some implementations, at least one signal is based on a number of replies to each content item. In some implementations, at least one signal is based on a number of content items preceding each content item. In some implementations, the selecting of one of the subsets is based at least in part on sizes of the content items. In some implementations, the method further includes truncating one or more of the content items to be displayed based at least in part on sizes of the content items.

In some implementations, a method includes obtaining a plurality of content items. In some implementations, the method further includes determining a first subset of content items from the plurality of content items, and where the determining of the first subset includes removing one or more content items from the plurality of content items. In some implementations, the method further includes computing importance scores for the content items in the first subset, where the computing of importance scores for the content items in the first subset is based on one or more signals, and where at least one signal is based on relationships between content items in the first subset. In some implementations, the method further includes aggregating the importance scores of the content items in the first subset. In some implementations, the method further includes determining a second subset of content items from the plurality of content items, and where the determining of the second subset includes removing one or more content items from the plurality of content items. In some implementations, the method further includes computing importance scores for the content items in the second subset, where the computing of importance scores for the content items in the second subset is based on one or more signals, and where at least one signal is based on relationships between content items in the second subset. In some implementations, the method further includes aggregating the importance scores of the content items in the second subset. In some implementations, the method further includes ranking the first and second subsets based on respective aggregated importance scores. In some implementations, the method further includes selecting one of the first and second subsets based at least in part on the ranking. In some implementations, the method further includes causing the content items of the selected subset to be displayed in a user interface.

In some implementations, a system includes one or more processors, and logic encoded in one or more tangible media for execution by the one or more processors. When executed, the logic is operable to perform operations including: determining a first subset of content items from a plurality of content items; computing importance scores for the content items in the first subset; aggregating the importance scores of the content items in the first subset; determining a second subset of content items from the plurality of content items; computing importance scores for the content items in the second subset; aggregating the importance scores of the content items in the second subset; selecting one of the first and second subsets based at least in part on aggregated importance scores of the first and second subsets; and causing the content items of the selected subset to be displayed in a user interface.

With further regard to the system, to determine the first and second subsets of the content items, the logic when executed is further operable to perform operations including removing one or more content items from the plurality of content items. In some implementations, the computing of importance scores is based on one or more signals, and where at least one signal is based on a relationship between each content item and at least one other content item. In some implementations, at least one signal is based on a number of approval indicators associated with each content item. In some implementations, at least one signal is based on a popularity value associated with each commenter of each content item. In some implementations, at least one signal is based on a length of each content item. In some implementations, at least one signal is based on a number of replies to each content item. In some implementations, at least one signal is based on a number of content items preceding each content item. In some implementations, the selecting of one of the subsets is based at least in part on sizes of the content items.

Some implementations provide various advantages. For example, implementations optimize the display of content in a user interface based on relevance to the user and based on the context of the comments in relation to other comments that are to be displayed.

DETAILED DESCRIPTION

Implementations described herein optimize the display of content in a user interface in a social network system based on the relative importance of the items of content. In various implementations, a system receives content items (e.g., comments) for display in a comment stream portion of a user interface. Such content may include, for example, user comments to an online post. In some implementations, the system computes an importance score for each content item based on one or more signals. In some implementations, the one or more signals may include one or more of a number of approval indicators associated with each content item, a popularity value associated with each commenter of each content item, a length of each content item, a number of replies to each content item, and a number of content items preceding each content item. The system then ranks the content items from most important to least important based on the importance scores computed for each content item.

The system then selects content items to be displayed within the comment stream portion of the user interface based at least in part on the ranking of the content items. In some implementations, the selected content items include the highest ranking content items. In some implementations, the selecting of the content items is based at least in part on the sizes of the highest ranking content items and the size or area of the comment stream portion of the user interface. In some implementations, the system may truncate one or more of the selected content items based at least in part on the sizes of the selected content items, the size of the comment stream portion of the user interface, and the relative importance of content items. The system then causes the content items to be displayed in the comment stream portion of the user interface.

In some implementations, the system determines subsets of content items from the entirety of content items, where each subset includes a unique combination of content items. The system then computes an importance score for each content item in each subset, aggregates the importance scores of the content items for each subset, and then selects one of the subsets based at least in part on the aggregated importance scores.

As a result, implementations optimize the display of the content in a user interface. Implementations maximize the visibility of important content by displaying content from most important to least important. Given the finite attention span of users, implementations focus users on the most important content.

For ease of illustration, some example implementations are described herein in the context of content items in comments to original posts. Similar implementations may also apply to content items in original posts. For example, while system 102 may show comments in the order of most important to least important in a comments portion of a user interface, system 102 may also show original posts in the order of most important to least important in an activity stream of the user interface.

Figure 1:
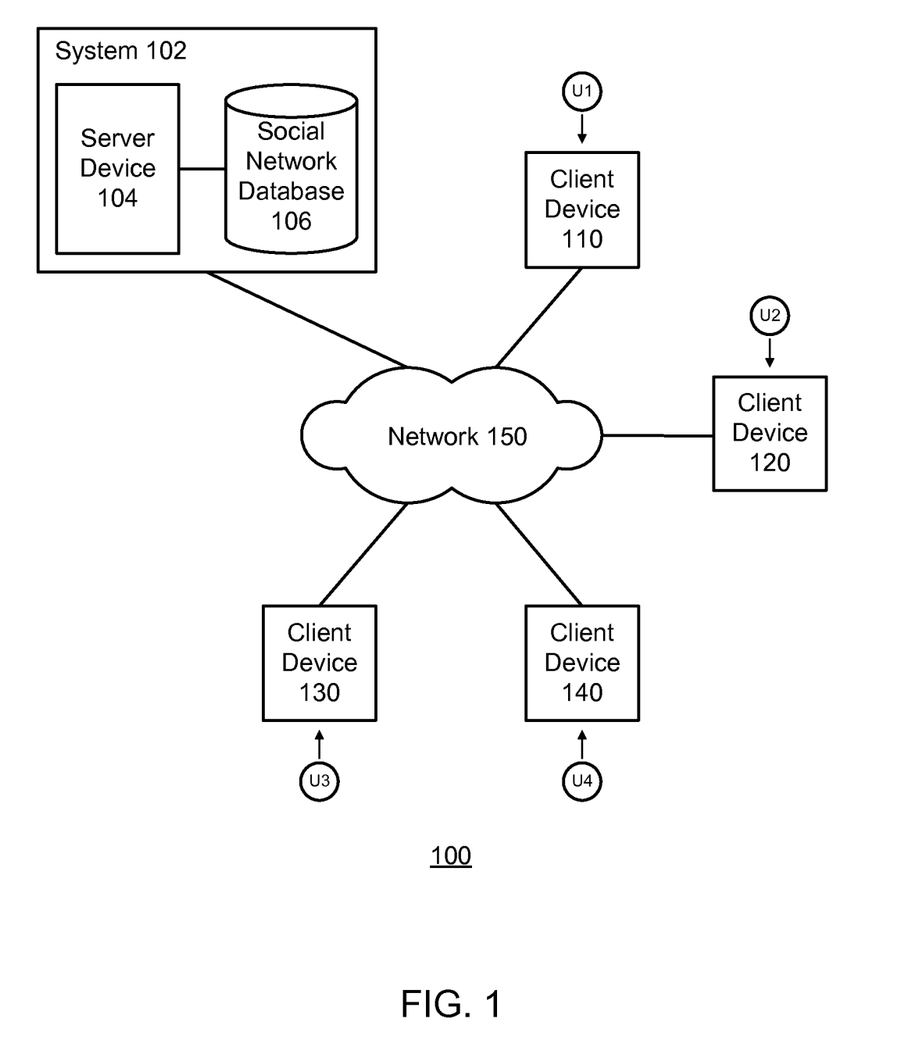
FIG. 1 illustrates a block diagram of an example network environment, which may be used to implement the implementations described herein.

FIG. 1 illustrates a block diagram of an example network environment 100, which may be used to implement the implementations described herein. In some implementations, network environment 100 includes a system 102, which includes a server device 104 and a social network database 106. The term system 102 and phrase "social network system" may be used interchangeably. Network environment 100 also includes client devices 110, 120, 130, and 140, which may communicate with each other via system 102 and a network 150. Client devices may include smart phones, tablets, notebook computers, desktop computers, or any other suitable electronics device having access to the social network system For ease of illustration, FIG. 1 shows one block for each of system 102, server device 104, and social network database 106, and shows four blocks for client devices 110, 120, 130, and 140. Blocks 102, 104, and 106 may represent multiple systems, server devices, and social network databases. Also, there may be any number of client devices. In other implementations, network environment 100 may not have all of the components shown and/or may have other elements including other types of elements instead of, or in addition to, those shown herein.

In various implementations, users U1, U2, U3, and U4 may communicate with each other using respective client devices 110, 120, 130, and 140. For example, users U1, U2, U3, and U4 may post and/or read activities and comments about activities on the social network system using respective client devices 110, 120, 130, and 140.

Figure 2:
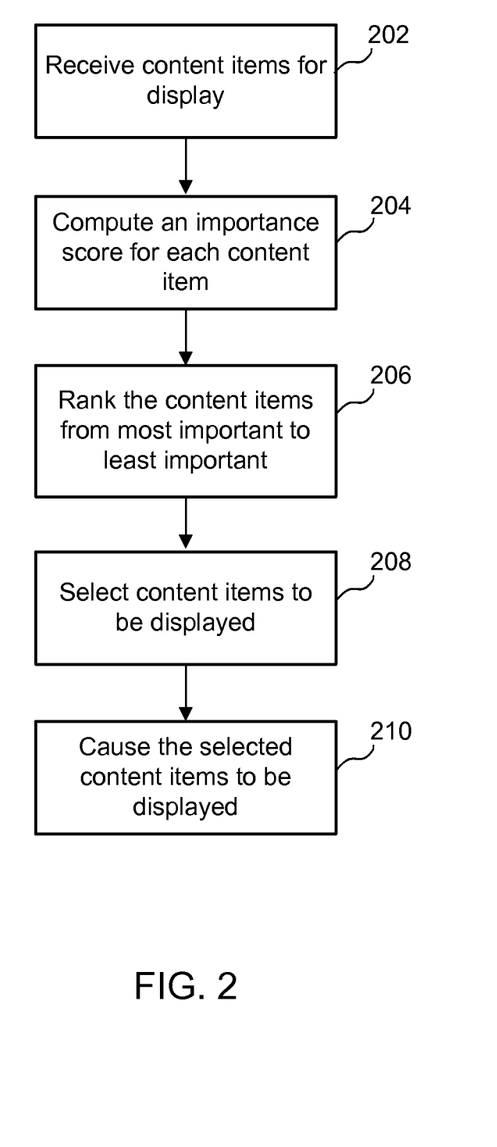
FIG. 2 illustrates an example simplified flow diagram for displaying content items in a user interface in a social network system, according to some implementations.

FIG. 2 illustrates an example simplified flow diagram for displaying content items in a user interface in a social network system, according to some implementations. Referring to both FIGS. 1 and 2, a method is initiated in block 202, where system 102 receives content items for display in a portion of a user interface. In various implementations described herein, the portion of the user interface may also be referred to as the comment stream portion.

In various implementations, system 102 receives the content items from various users of the social network system, via respective client devices such as client devices 110, 120, 130, and 140 of FIG. 1. Such client devices 110, 120, 130, and 140 may include smart phones, tablets, notebook computers, desktop computers, or any other suitable electronic devices having access to the social network system.

Figure 3:
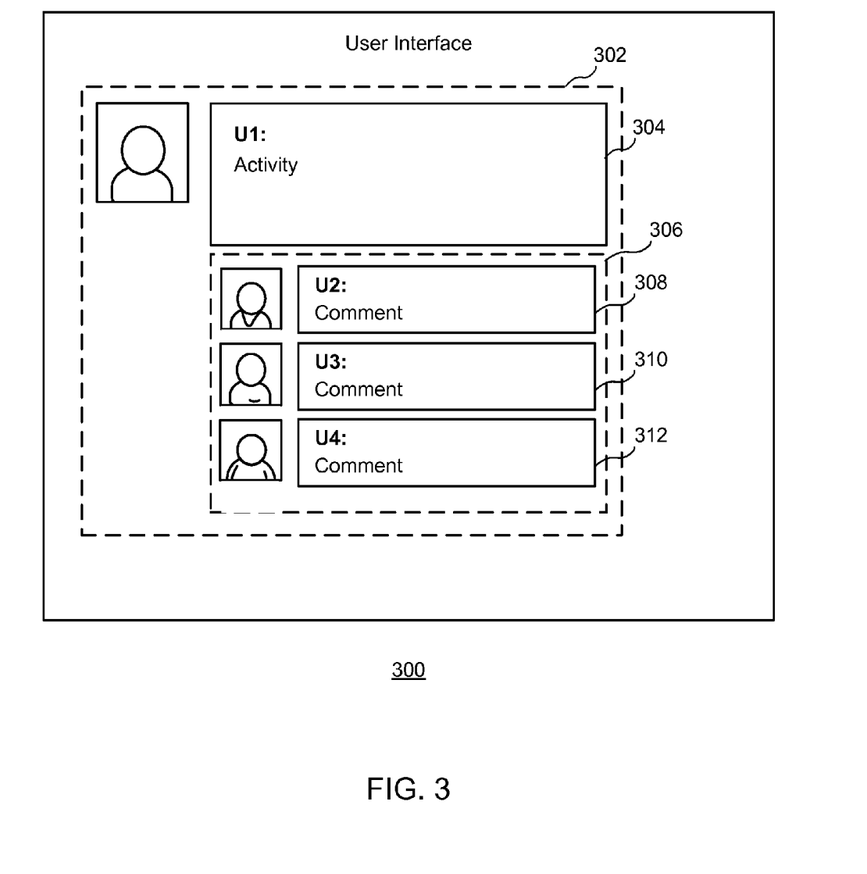
FIG. 3 illustrates an example simplified user interface, according to some implementations.

FIG. 3 illustrates an example simplified user interface 300, according to some implementations. As shown, user interface 300 includes an activity stream portion 302 that displays one or more activity postings. For ease of illustration, one activity post 304 is shown. Activity post 304 may represent multiple activity postings, and there may be any number of activity postings. An activity posting may include text, links to websites, links to videos, images, etc.

User interface 300 also includes a comments stream portion 306 that displays one or more comments, also referred to herein as content items. Such content items may include, for example, comments in response to activities, which may contain text, links to webpages, images, links to video or audio content, further comments on any of these example content items, including comments about comments, etc.

For ease of illustration, three comments 308, 310, and 312 are shown. As described herein, the particular number of comments shown may vary, and will depending on a predetermined size or area of the comments stream portion. In various implementations, comment stream portion 306 may be positioned in any predetermined location in the user interface that is dedicated to a stream of content items.

In some implementations, comment stream portion 306 may be a resizeable window having a handle (e.g., icon of a handle) at the end of a short list of comments. System 102 may enable the user to pull the handle down in order for comment stream portion 306 to become larger and to display additional comments. Conversely, system 102 may enable the user to pull the handle up in order to for comment stream portion 306 to become smaller and to display fewer comments.

In block 204, system 102 computes an importance score for each content item based on one or more signals. As described in more detail below, the particular signal or combination of signals may vary, and will depend on the particular implementation.

In some implementations, system 102 may compute an importance score for each content item based on a number of approval indicators associated with each content item. In various implementations, such approval indicators may include signals associated with whether a given content item has been read, shared, approved, commented on, etc.

In some implementations, system 102 may compute an importance score for each content item based on a popularity value associated with each commenter of each content item. In some implementations, the popularity value may be directly proportional to the number of followers and/or social connections that a particular commenter has, and/or directly proportional to the social affinity (e.g., degrees of separation) between the commenter and the user viewing the content item.

In some implementations, system 102 may compute an importance score for each content item based on the length of each content item. For example, in some implementations, system 102 may give a higher importance score to content items that are longer. A larger amount of text indicates more thought and effort, and thus would indicate more importance. In some implementations, system 102 may give a higher importance score to content items that are concise. A concise statement may also indicate more thought and effort, and thus would indicate more importance. The optimal length of a given content item may vary and will depend on the particular implementation.

In some implementations, system 102 may compute an importance score for each content item based on a number of replies to each content item. For example, system 102 may give a higher importance score to content items where the total number of replies to such content items is larger. A larger number of replies to content items indicates more interest in the content items.

In some implementations, system 102 may compute an importance score for each content item based on a number of content items preceding each content item. In some implementations, system 102 may compute an importance score for each content item based on the actual content. For example, content items that contain photos may be given an importance score. Content items that contain photos combined with text (a caption), or a tag (e.g., face tag) may be given a higher importance score.

In some implementations, system 102 may compute an importance score for each content item based on a number of re-shares of each content item. For example, system 102 may give a higher importance score to content items where the total number of re-shares of such content items is larger. A larger number of re-shares indicates more interest in the content item.

In some implementations, system 102 may compute importance scores described herein per user (e.g., for each user viewing a given user interface). This ensures that the most relevant content items to the user viewing the content are given the most visibility.

In various implementations, system 102 may utilize machine learning to optimize parameter selection in order to tune the selection, importance, popularity, and approval parameters for optimum user engagement.

In block 206, system 102 ranks the content items from most important to least important based on the importance score computed for each content item. As described in more detail below in connection with FIG. 4, in some implementations, at each stage, the entirety of the list of content items may be examined, and the weakest content item is removed. This is because the visibility of any one content item may influence the importance score of other content items in the content stream.

In block 208, system 102 selects content items to be displayed within the comment stream portion of the user interface based at least in part on meeting a predetermined threshold. For example, system 102 may select content items based at least in part on being the highest ranking content items. System 102 may also select content items based at least in part on the sizes of highest ranking content items and a size of the portion of the user interface. Such selective visibility of content preserves the most relevant conversation for the user given any size of the content stream.

In some implementations, system 102 may select the maximum number of the highest ranking content items that will fit into the comment stream portion of the user interface. In some implementations, system 102 determines the size of the comment stream portion of the user interface. System 102 then determines the maximum number of the highest ranking content items that will fit into the comment stream portion of the user interface.

In block 210, system 102 causes the selected content items to be displayed in the comment stream portion of the user interface. In various implementations, system 102 selectively displays more or fewer content items depending upon the size of content stream portion 306. In some implementations, system 102 may still display the least important items, but they will be positioned toward the end of the content stream. In some implementations, system 102 displays the original post associated with the content item. For example, if the original post is a video, system 102 may display the video along with the selected content items.

Figure 4:
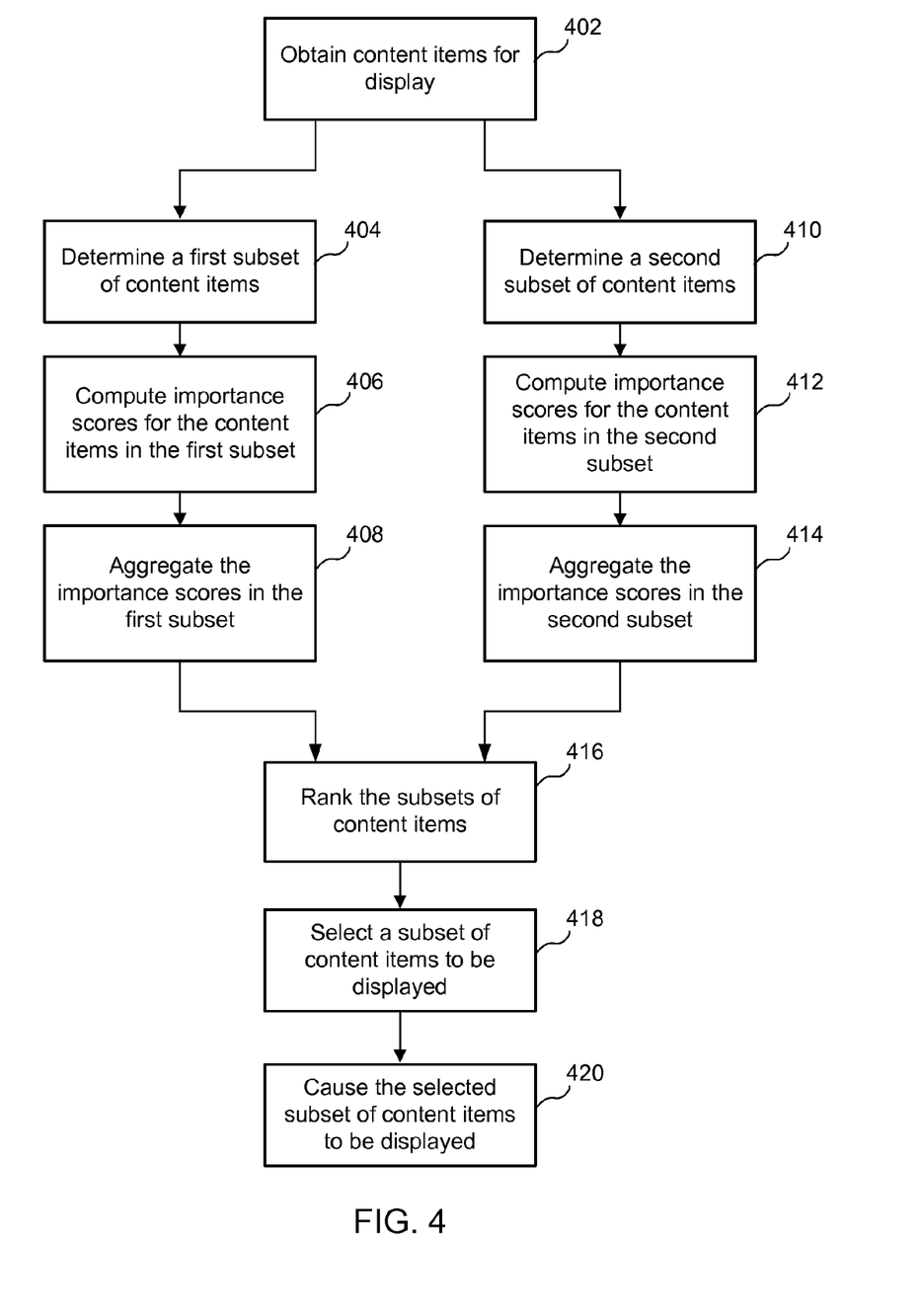
FIG. 4 illustrates an example simplified flow diagram for displaying content items in a user interface in a social network system, according to some implementations.

FIG. 4 illustrates an example simplified flow diagram for displaying content items in a user interface in a social network system, according to some implementations. Referring to both FIGS. 1 and 4, a method is initiated in block 402, where system 102 obtains content items for display in a portion of a user interface (e.g., in comment stream portion 306 of FIG. 3). System 102 receives the content items from various users of the social network system (e.g., via client devices 110, 120, 130, and 140 of FIG. 1). In various implementations described herein, the portion of the user interface may also be referred to as the comment stream portion.

In block 404, system 102 determines a first subset of content items from the plurality of content items. In some implementations, each determined subset of content items includes a unique combination of content items. As described in more detail below, in various implementations, system 102 determines each subset of content items by removing one or more content items from the entirety of content items.

In block 406, system 102 computes an importance score for each content item in the first subset of content items. In various implementations, system 102 computes the importance scores based on one or more signals, and the particular signal or combination of signals may vary, depending on the particular implementation. For example, as described in detail above, signals may be based on the number of approval indicators associated with each content item; the popularity value associated with each commenter of each content item; the length of each content item; the number of replies to each content item; the number of content items preceding each content item, etc. In some implementations, one or more signals may be based on the relationship between each content item and at least one other content item.

As indicated above, system 102 may compute importance scores described herein per user (e.g., for each user viewing a given user interface). This ensures that the most relevant content items to the user viewing the content are given the most visibility. Also, system 102 may utilize machine learning to optimize parameter selection in order to tune the selection, importance, popularity, and approval parameters for optimum user engagement.

In block 408, system 102 aggregates the importance scores of the content items for the first subset of content items.

In block 410, system 102 determines a second subset of content items from the plurality of content items. In block 412, system 102 computes an importance score for each content item in the second subset of content items. As indicated above, in various implementations, system 102 computes the importance scores based on one or more signals, and the particular signal or combination of signals may vary, depending on the particular implementation. Example signals are described above in connection with block 406. In block 414, system 102 aggregates the importance scores of the content items for the second subset of content items.

For ease of illustration, FIG. 4 shows two subsets of content items. In some implementations, there may be significantly more subsets (e.g., hundreds, thousands, etc.).

In some implementations, there may be, for example, a set of 100 content items related to an original post. System 102 may then generate N−1 (e.g., 99) subsets of content items, where each subset includes N−1 content items. Each subset has a distinct or unique combination of content items, because each subset has different content items removed. In other words, there would be 99 different subsets, each with a different combination of 99 content items.

In some implementations, system 102 may then iteratively generate subsequent, smaller subsets of content items, each having a unique subset of (N−2) content items. Each subset has a unique combination of content items, because each subset has a different combination of content items removed. In the example above with a set of 100 content items, for this series of N−2 subsets, there would be 98 different subsets, each with a different combination of 98 content items. System 102 continues this process (e.g., N−3 subsets, N−4 subsets, etc.) until system 102 has determined a predetermined number of subsets of content items (e.g., all possible subsets).

With regard to the N−2 subset of the example above, in some implementations, none of the N−2 subsets contain the lowest ranking content item (e.g., content item with the lowest importance score) from the original set, because the lowest ranking content item from the N−1 subsets would be have been removed from the N−2 subsets. Similarly, none of the N−3 subsets, N−4 subsets, etc. contain the lowest ranking content item from the original set.

In some implementations, system 102 may determine an original aggregated importance score for an original set of N content items, an aggregated importance score for each N−1 subset, an aggregated importance score for each N−2 subset, etc. System 102 continues until system 102 has determined a different aggregated importance score for the all unique subsets.

In block 416, system 102 ranks the subsets (e.g., first subset, second subset, etc.) of content items based on respective aggregated importance scores. In some implementations, system 102 ranks the subsets based on the aggregated importance scores computed for the content items in each subset of content items. As such, the higher ranking subsets of content items will have content items with higher importance scores.

In some implementations, system 102 iteratively ranks the subsets of content items. In other words, with the example above, for each iteration (e.g., N−1 subsets, N−2 subsets, etc.), system 102 compares and ranks all of the aggregated importance scores to determine which content item or content items had the least impact after being removed. For example, in one iteration (e.g., N−1 subsets), system 102 may compare and rank all of the aggregated importance scores of the N−1 subsets to determine which content item has the least impact after being removed from the N−1 subsets.

In some implementations, having the least impact means that the after the content item is removed, the aggregated score of the remaining content items in the subset remains relatively high (e.g., little or no change). This is because that removed content item has a relatively low importance score, which has less of an impact on the aggregated score of a given subset of content items. In contrast, having the most impact means that the after the content item is removed, the aggregated score of the remaining content items in the subset significantly drops. This is because that removed content item has a relatively high importance score, which has more of an impact on the aggregated score of a given subset of content items. In some implementations, for the N−1 subsets, the content item having the most impact after being removed would be deemed to rank first.

In a subsequent iteration (e.g., N−2 subsets), system 102 may then compare and rank all of the aggregated importance scores of the N−2 subsets to determine which content items have the least impact after being removed from the N−2 subsets. In some implementations, the content items having the least impact would be deemed to rank last and second-to-last.

As indicated above, at each stage, the entirety of the list of content items may be examined, and the weakest, least impacting of its subset, content item(s) are removed. This is because the visibility of any one content item may influence the importance score of other content items in the content stream. For example, a follow-up response comment in response to an original comment may be more important if the original comment is visible. Without the original comment visible, there may be lost context for the response comment. As a result, some implementations described herein are directed toward removing a single comment at a time, after an evaluation of the entire set of comments.

Still referring to FIG. 4, in block 418, system 102 selects one of the subsets of content items based at least in part on the aggregated importance scores. As described in more detail below, the selected subset of content items is to be displayed within a comment stream portion of the user interface.

In some implementations, system 102 selects one of the subsets of content items based at least in part on the ranking of the content items. For example, system 102 may select the content items based at least in part on the sizes of the content items in the subsets that meet a predetermined threshold (e.g., the highest ranking subsets of content items). System 102 may also select the content items based at least in part on the size of the portion of the user interface in which the selected content items will be displayed.

For example, in some implementations, system 102 continues this process described in the example above (e.g., N−1 subsets, N−2 subsets, N−3 subsets, etc.) until the comment stream portion, given its predetermined size, can accommodate the highest ranked content items. For example, if the size of the comment stream portion can accommodate 3 content pieces and there are originally 100 content pieces, system 102 may continue the process described above until a subset of N−97 remains. Removing content items one-by-one from a content stream in order of least important to most important results in the most important content being displayed. In some implementations, for example, the removal of a follow-up response comment on a content item may cause that content item to have a lower importance score, because of the relationship between the content item and removed follow-up response comment.

In various implementations, system 102 may repeat the entire process whenever a new content item is added by a user. This ensures that the most important content items are selected in the context of the group of content items.

In various implementations, system 102 may perform the entire process for each user. This ensures that the most important and relevant content items are selected in the context of the group of content items for that user. Such selective visibility of content preserves the most relevant conversation for the user, given any sized area of the content stream.

In some implementations, system 102 may select the maximum number of the highest ranking content items that will fit into the comment stream portion of the user interface. In some implementations, system 102 determines the size of the comment stream portion of the user interface on the display. System 102 then determines the maximum number of the highest ranking content items that will fit into the comment stream portion of the user interface.

In block 420, system 102 causes the selected subset of content items to be displayed in the comment stream portion of the user interface (e.g., in comment stream portion 306 of FIG. 3). In various implementations, system 102 selectively displays more or fewer content items depending upon the size/area of content stream portion 306. In some implementations, system 102 may still display the least important items, but they will be positioned toward the end of the content stream. In some implementations, system 102 displays the original post associated with the content item. For example, if the original post is a video, system 102 may display the video along with the selected content items.

In some implementations described herein, including those described in connection with FIGS. 2 and 4, system 102 may truncate one or more of the selected content items based at least in part on their sizes and a size of the comment stream portion of the user interface. In some implementations, system 102 may also truncate one or more of the selected content items based at least in part on the relative importance of the content. For example, if system 102 determines that the content stream portion accommodates the three 3 highest ranking content items, but 4 content items are ranked relatively high in importance, system 102 may still select 4 content items and truncate the 4 content items such that all 4 content items still fit within the comment stream portion.

In some implementations, system 102 may truncate any one or more sentences in any paragraph, any one or more paragraphs in any content item, any one or more activities in any content item, etc. System 102 may truncate a particular sentence or paragraph such that key phrases remain displayed. Such key phrases may include a link to a webpage or video, etc. In some implementations, if system 102 displays the original post associated with the selected content items, system 102 may also truncate the original post in a similar manner to truncating the selected content items. In various implementations, truncating the selected content items provides a form of compression in that less information is transmitted, which saves bandwidth and makes it faster to display the content items.

Although the steps, operations, or computations described herein may be presented in a specific order, the order may be changed in particular implementations. For example, blocks 404, 406, and 408 may be performed before, after, or substantially at the same time as blocks 410, 412, and 414. Other orderings of the steps are possible, depending on the particular implementation. In some particular implementations, multiple steps shown as sequential in this specification may be performed at the same time.

While system 102 is described as performing the steps as described in the implementations herein, any suitable component or combination of components of system 102 or any suitable processor or processors associated with system 102 may perform the steps described.

Implementations described herein provide various benefits. For example, implementations optimize the display of the content in a user interface. Implementations display the most relevant conversation to the user by maximizing the visibility of important content most important to least important based on various signals. Implements described herein are particularly beneficial in mobile applications, where screen real estate is particularly limited.

Figure 5:
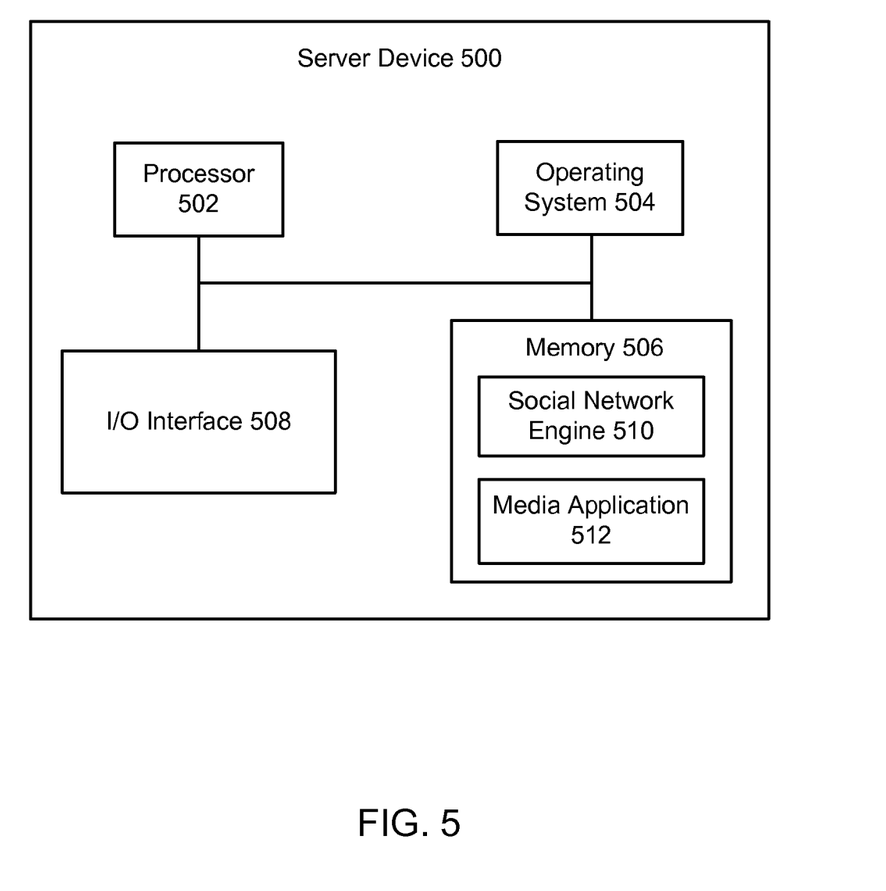
FIG. 5 illustrates a block diagram of an example server device, which may be used to implement the implementations described herein.

FIG. 5 illustrates a block diagram of an example server device 500, which may be used to implement the implementations described herein. For example, server device 500 may be used to implement server device 104 of FIG. 1, as well as to perform the method implementations described herein. In some implementations, server device 500 includes a processor 502, an operating system 504, a memory 506, and an input/output (I/O) interface 508. Server device 500 also includes a social network engine 510 and a media application 512, which may be stored in memory 506 or on any other suitable storage location or computer-readable medium. Media application 512 provides instructions that enable processor 502 to perform the functions described herein and other functions.

For ease of illustration, FIG. 5 shows one block for each of processor 502, operating system 504, memory 506, I/O interface 508, social network engine 510, and media application 512. These blocks 502, 504, 506, 508, 510, and 512 may represent multiple processors, operating systems, memories, I/O interfaces, social network engines, and media applications. In other implementations, server device 500 may not have all of the components shown and/or may have other elements including other types of elements instead of, or in addition to, those shown herein.

Although the description has been described with respect to particular implementations thereof, these particular implementations are merely illustrative, and not restrictive. Concepts illustrated in the examples may be applied to other examples and implementations. For example, in various implementations, system 102 may process content items of original posts in an activity stream in a similar manner that system 102 processes content items of comments to a given post. Accordingly, system 102 may show original post in the order of most important to least important.

Note that the functional blocks, methods, devices, and systems described in the present disclosure may be integrated or divided into different combinations of systems, devices, and functional blocks as would be known to those skilled in the art.

Any suitable programming languages and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some particular implementations, multiple steps shown as sequential in this specification may be performed at the same time.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

What is claimed is:

1. A method comprising:
   obtaining a plurality of content items;
   determining a first subset of content items from the plurality of content items, and wherein the determining of the first subset includes removing one or more content items from the plurality of content items;
   computing scores for the content items in the first subset, wherein the computing of scores for the content items in the first subset is based on one or more signals, and wherein at least one signal is based on relationships between content items in the first subset;
   aggregating the scores of the content items in the first subset;
   determining a second subset of content items from the plurality of content items, and wherein the determining of the second subset includes removing a different one or more content items from the plurality of content items relative to the content items removed to determine the first subset;
   computing scores for the content items in the second subset, wherein the computing of scores for the content items in the second subset is based on one or more signals, and wherein at least one signal is based on relationships between content items in the second subset;
   aggregating the scores of the content items in the second subset;
   ranking the first and second subsets based on respective aggregated scores;
   selecting, using a hardware processor, one of the first and second subsets based at least in part on the ranking; and
   causing the content items of the selected subset to be displayed in a user interface.

2. A method comprising:
   determining a first subset of content items from a plurality of content items;
   computing scores for the content items in the first subset based at least on relationships between content items in the first subset;
   aggregating the scores of the content items in the first subset;
   determining a second subset of content items from the plurality of content items, wherein the second subset has a different combination of content items than the first subset;
   computing scores for the content items in the second subset based at least on relationships between content items in the second subset;
   aggregating the scores of the content items in the second subset;
   selecting, using a hardware processor, one of the first and second subsets based at least in part on respective aggregated scores of the first and second subsets; and
   causing the content items of the selected subset to be displayed in a user interface.

3. The method of claim 2, wherein the determining of the first and second subsets includes removing one or more content items from the plurality of content items.

4. The method of claim 2, wherein the selecting one of the first and second subsets includes ranking the first and second subsets based on the respective aggregated scores and selecting one of the first and second subsets based at least in part on the ranking.

5. The method of claim 2, wherein the computing of scores is based on one or more signals, and wherein at least one signal is based on a number of approval indicators associated with each content item.

6. The method of claim 2, wherein the computing of scores is based on one or more signals, and wherein at least one signal is based on a popularity value associated with each commenter of each content item.

7. The method of claim 2, wherein the computing of scores is based on one or more signals, and wherein at least one signal is based on a length of each content item.

8. The method of claim 2, wherein the computing of scores is based on one or more signals, and wherein at least one signal is based on a number of replies to each content item.

9. The method of claim 2, wherein the computing of scores is based on one or more signals, and wherein at least one signal is based on a number of content items preceding each content item.

10. The method of claim 2, wherein the selecting of one of the subsets is based at least in part on sizes of the content items.

11. The method of claim 2, further comprising truncating one or more of the content items to be displayed based at least in part on sizes of the content items.

12. A system comprising:
    one or more processors; and
    logic encoded in one or more tangible media for execution by the one or more processors and when executed operable to perform operations comprising:
    determining a first subset of content items from a plurality of content items;
    computing scores for the content items in the first subset based at least on relationships between content items in the first subset;
    aggregating the scores of the content items in the first subset;
    determining a second subset of content items from the plurality of content items, wherein the second subset has a different combination of content items than the first subset;

computing scores for the content items in the second subset based at least on relationships between content items in the second subset;

aggregating the scores of the content items in the second subset;

selecting one of the first and second subsets based at least in part on respective aggregated scores of the first and second subsets; and causing the content items of the selected subset to be displayed in a user interface.

13. The system of claim 12, wherein to determine the first and second subsets, the logic when executed is further operable to perform operations comprising removing one or more content items from the plurality of content items.

14. The system of claim 12, wherein the selecting one of the first and second subsets includes ranking the first and second subsets based on the respective aggregated scores and selecting one of the first and second subsets based at least in part on the ranking.

15. The system of claim 12, wherein the computing of scores is based on one or more signals, and wherein at least one signal is based on a number of approval indicators associated with each content item.

16. The system of claim 12, wherein the computing of scores is based on one or more signals, and wherein at least one signal is based on a popularity value associated with each commenter of each content item.

17. The system of claim 12, wherein the computing of scores is based on one or more signals, and wherein at least one signal is based on a length of each content item.

18. The system of claim 12, wherein the computing of scores is based on one or more signals, and wherein at least one signal is based on a number of replies to each content item.

19. The system of claim 12, wherein the computing of scores is based on one or more signals, and wherein at least one signal is based on a number of content items preceding each content item.

20. The system of claim 12, wherein the selecting of one of the subsets is based at least in part on sizes of the content items.

* * * * *